US009279333B2

(12) United States Patent
Murdoch

(10) Patent No.: US 9,279,333 B2
(45) Date of Patent: Mar. 8, 2016

(54) TURBINE ROTOR ASSEMBLY

(75) Inventor: Peter John Murdoch, Duffy Forest (AU)

(73) Assignee: WAVE POWER RENEWABLES LIMITED, Hong Kong (CN)

( * ) Notice: Subject to any disclaimer, the term of this patent is extended or adjusted under 35 U.S.C. 154(b) by 261 days.

(21) Appl. No.: 13/880,910

(22) PCT Filed: Oct. 21, 2011

(86) PCT No.: PCT/AU2011/001333
§ 371 (c)(1),
(2), (4) Date: Apr. 22, 2013

(87) PCT Pub. No.: WO2012/051656
PCT Pub. Date: Apr. 26, 2012

(65) Prior Publication Data
US 2013/0255246 A1   Oct. 3, 2013

(30) Foreign Application Priority Data
Oct. 22, 2010  (AU) .................................. 2010904731

(51) Int. Cl.
F03C 1/00        (2006.01)
F03B 13/10       (2006.01)
F01D 5/30        (2006.01)
F03B 13/14       (2006.01)

(52) U.S. Cl.
CPC ................ *F01D 5/30* (2013.01); *F03B 13/142* (2013.01); *F05B 2210/404* (2013.01); *Y02E 10/32* (2013.01); *Y02E 10/38* (2013.01)

(58) Field of Classification Search
CPC ......... F01D 5/30; F03B 13/142; Y02E 10/32; Y02E 10/38; F05B 2210/404
USPC .................................. 60/497–507; 290/42, 53
See application file for complete search history.

(56) References Cited

U.S. PATENT DOCUMENTS

| 4,829,833 | A  | * | 5/1989 | Feller ......................... 73/861.77 |
| 5,191,225 | A  |   | 3/1993 | Wells |
| 8,177,517 | B2 |   | 5/2012 | Grabau |
| 8,801,386 | B2 | * | 8/2014 | Keir et al. ................. 416/223 R |
| 2005/0285407 | A1 | * | 12/2005 | Davis et al. ..................... 290/54 |
| 2006/0002786 | A1 | * | 1/2006 | Richter ......................... 415/4.5 |
| 2009/0317230 | A1 |   | 12/2009 | Tease et al. |
| 2011/0142656 | A1 |   | 6/2011 | Arlitt et al. |

FOREIGN PATENT DOCUMENTS

| CA | 2667618 A1 | 12/2010 |
| CN | 85108806   | 3/1987 |
| JP | 57-83670   | 5/1982 |
| JP | 57-193780  | 11/1982 |
| JP | 60-90990   | 5/1985 |
| JP | 63-85201   | 4/1988 |

(Continued)

*Primary Examiner* — Hoang Nguyen
(74) *Attorney, Agent, or Firm* — Harness, Dickey & Pierce, P.L.C.

(57) ABSTRACT

A turbine rotor assembly for extracting energy from an oscillating working fluid. The turbine rotor assembly includes a hub rotatable about a central axis. A plurality of blades is mounted to the hub about the central axis. Each blade has a leading edge and a trailing edge which are configured to be complementary in profile to each other such that the blades can be mounted in close fitting edge-to-edge proximity to each other.

38 Claims, 11 Drawing Sheets

(56) References Cited

FOREIGN PATENT DOCUMENTS

| | | |
|---|---|---|
| JP | 2055801 A | 2/1990 |
| JP | 9-287546 | 11/1997 |
| JP | 10-288139 | 10/1998 |
| WO | WO-2007009163 A1 | 1/2007 |
| WO | WO-2009064190 A1 | 5/2009 |
| WO | WO 2009/126996 * | 10/2009 |
| WO | WO-2011113424 A2 | 9/2011 |

* cited by examiner

TURBINE ROTOR ASSEMBLY

CROSS-REFERENCE TO RELATED APPLICATIONS

This application is a National Stage of International Application No. PCT/AU2011/001333, filed Oct. 21, 2011, which claims the benefit and priority of Australian Application No. 2010904731, filed Oct. 22, 2010. The entire disclosures of the above applications are incorporated herein by reference.

FIELD OF THE INVENTION

The present invention relates generally to energy conversion devices. More particularly, this invention relates to turbines and primarily to unidirectional reaction turbines.

The invention has been developed primarily for use in an ocean wave energy extraction system employing an oscillating water column and will be described hereinafter with reference to this application. However, it will be appreciated that the invention is not limited to this particular field of use.

BACKGROUND OF THE INVENTION

With an ever increasing concern of the impact traditional energy systems have had or are having on the environment, new methods and systems are currently being developed for reducing the impact such systems have on the environment.

A number of these systems rely on turbines to rotate an electric generator in order to produce electricity. The problem with many such systems proposed to date is that a significant capital outlay is required to set up a new system. The extent of this capital outlay can often act as a deterrent to investors, as the return on investment is limited to some extent by the relationship between the capital outlay and the efficiency of the system.

The turbines currently employed in such systems operate at a relative low efficiency and the energy extraction system as a whole is limited by the efficiency of these turbines.

It is an object of the present invention to overcome or ameliorate one or more of the disadvantages of the prior art, or at least to provide a useful alternative.

SUMMARY OF THE INVENTION

According to a first aspect of the invention, there is provided a turbine rotor assembly for extracting energy from an oscillating working fluid, the turbine rotor assembly including:

a hub rotatable about a central axis;

a plurality of blades mountable to the hub about the central axis, each blade having a leading edge and a trailing edge, wherein the leading edge and trailing edge are configured to be complementary in profile to each other such that the blades can be mounted in close fitting edge-to-edge proximity to each other.

Preferably, the plurality of blades are arranged sequentially to form a circular array about the central axis. The blades are preferably arranged in a non-overlapping sequential formation.

It will be appreciated that the close fitting edge-to-edge proximity between sequentially mounted blades which can be achieved with the complementary profiled leading and trailing edges advantageously results in an increased frontal surface area of each blade, and consequentially reduces the gap between blades (when viewing the rotor from the front or back—i.e. along the line of the central axis). Moreover, the complementary profiles provide for a substantially constant gap width along the length of the adjacent edges. The gap is preferably as small as possible and only provided for mechanical working clearances. That is, the width of the gap is preferably dictated by the predetermined mechanical tolerances associated with manufacturing the blades. In certain preferred embodiments, the gap width along the length of adjacent blade edges is approximately 1 mm or less.

This increased surface area thus enables a working fluid to pass across more blade surface which in turns improves the efficiency of the thrust arising from the lift forces generated by the working fluid flowing over the blade and accelerating through the nozzle, the thrust acting to rotate the hub and blades about the central axis.

Preferably, each blade is mounted to the hub via a mounting means. The mounting means preferably includes first mounting elements associated with the hub and second mounting elements associated with the blades, wherein each first mounting element cooperates with a respective one of the second mounting elements to securely mount the blade to the hub. The mounting means preferably includes a fastening means to engage and hold the respective first and second mounting elements in fixed relation to each other. The fastening means may, for example, be a fastener such as a screw or a screw and nut combination or the like.

In some preferred embodiments, each first mounting element is preferably in the form of a plurality of receiving formations in the hub for receiving the spindle or spigot of the associated blade. In certain preferred embodiments, each second mounting element is a shaft, spindle or a spigot extending from a root of the blade.

Preferably, the blade is movable relative to the hub such that the blade can change its pitch (or angle of attack) relative to the direction of flow of the working fluid so that the hub and blades rotate in the same direction regardless of the fluid flow direction.

In some preferred embodiments, each blade moves in response to a force or pressure applied to the blade by the working fluid. That is, each blade is preferably configured to be self-rectifying such that it automatically changes its pitch in response to the prevailing characteristics of the working fluid. For example, the blades may change their pitch in response to changes in pressure and/or direction of flow of the working fluid. In some embodiments, the mounting means is configured such that all blades change their pitch at the same time and by the same degree. In other preferred embodiments, the pitch of each blade is changed independently to changes in pitch of the other blades.

Each blade is preferably rotatably mounted to the hub via a shaft, wherein the shaft or spindle defines an axis of rotation for that blade. Preferably, the shaft of each blade is mounted in a bearing arrangement in the associated receiving formation in the hub such that the blade is rotatable relative to the hub. The bearing arrangement preferably includes one or more bearings and may be a stacked arrangement of two or more bearings. The stacked arrangement preferably includes a stack of four angular contact thrust ball bearings.

Each blade preferably rotates about its associated shaft/spindle to change its pitch angle relative to the direction of flow of the working fluid so that the hub and blades rotate in one direction only about the central axis. Preferably, each blade is configured to be able to rotate about the spindle through a predetermined angle. In certain preferred embodiments, each blade can rotate through an angle of up to approximately ±45°, ±40°, ±35°, ±30°, ±25°, ±20°, ±15°, ±10° or ±5°. In one preferred embodiment, each blade can rotate through an angle of up to approximately ±16°. It will be appreciated that the actual angle through which the blade can rotate is not limited to the examples provided above, but rather can be configured to suit a particular application.

Preferably, the rotatable blades can be retained in a neutral position or closed position wherein each blade is aligned around the circumference of the hub to substantially or effectively close the fluid passageway through the blades. The rotatable blades preferably can also be retained at the position of their maximum forward or reverse opening positions to maintain an open passageway through the blades, the blades moving in either the forward or reverse opening direction depending on the direction of fluid flow.

In some preferred embodiments, the blades are free to rotate in order to change their pitch automatically in response to the changes to the prevailing working fluid and/or the pressure in the air chamber. In other preferred embodiments, the changes to blade pitch are controlled by an actuator. The actuator is preferably responsive to changes in the characteristics/properties of the prevailing working fluid detected by sensors arranged within the flow passage (e.g. direction of flow and/or air chamber pressure). In various embodiments, the actuator can be mechanically, electromechanically, hydraulically or pneumatically operated. Preferably, the actuator is configured to open the blades in a first direction (e.g. forward direction upon exhaling of air from rising wave) based on upon a first set of criteria and in a second direction (e.g. reverse direction upon inhaling of air from a receding/falling wave) based on a second set of criteria. The first and second sets of criteria preferably include different parameters.

In certain preferred embodiments, a control means is associated with the blades for controlling the changes in pitch. The control means is preferably associated with the actuator of each blade. In some preferred embodiments, the controls means includes a damper or spring element for providing a smooth and/or constant change in pitch. In other embodiments, the control means can vary the speed at which the blade rotates. In certain embodiments, the control means can also act to limit the degree or angle to which the pitch of the blade can change. In certain preferred embodiments, the control means is in the form of a reactive mechanical spring such as, for example, a leaf spring. In others forms, the control means includes a torque arm. In some embodiments, the actuator and/or control means are in communication with a central controller such as, for example, a programmable logic controller (PLC).

The leading edge and trailing edge of each blade is preferably curved or arcuate in shape. Preferably, each leading edge is convex in curvature. Preferably, each trailing edge is concave in curvature. In some embodiments, the curvature of the leading and trailing edges has a constant radius of curvature. In other preferred embodiments, the radius of curvature of the leading and trailing edges varies along the length of the respective edge. Preferably, the radius of curvature of the leading edge is greater than the radius of curvature of the trailing edge.

In other preferred forms, the leading and trailing edges of each blade are substantially straight. In some embodiments, the straight edges of each blade taper away from each other from the root to the tip of the blade.

Preferably, the mounting means and shape of the blade is such that the centre-of-pressure is operatively behind the axis of rotation of the spindle of each blade so that the blade is able to rotate about its shaft in response to changes in pressure applied to the blade.

Preferably, each blade has a generally symmetrical cross-sectional profile. However, in certain preferred forms, asymmetric profiles can be employed. The cross-sectional profile is preferably in the form of an aerofoil. Preferably, the aerofoil has a biconvex (or convex-convexo) profile. In other embodiments, one surface of the aerofoil has a concave profile and the opposing surface is convex. The aerofoil profile preferably has an enlarged rounded leading edge and tapers inwardly towards a narrower trailing edge. In other preferred forms, each blade has a generally planar profile (e.g. a flat plate) with substantially parallel side faces.

In certain embodiments, the blades can be interchangeable with blades of a different profile so as to achieve a different operating characteristic of the turbine.

Preferably, the trailing edge of a first blade and the leading edge of a second blade immediately following the first blade together define a nozzle. It will be appreciated by those skilled in the art that the complementary shapes of the leading and trailing edges facilitate the provision of a nozzle of substantially constant width when the blades are in a neutral position or have a pitch angle of zero degrees (0°).

The control means preferably includes a pressure sensor for sensing the pressure in the air chamber of the oscillating water column (OWC) duct, the pressure sensor being operatively associated with the actuator and/or control means such that when a predetermined pressure is sensed the blades rotate to open the nozzles.

Preferably, each blade is in its closed position as the oscillating water column (OWC) starts to rise (i.e. at the OWC trough) such that the air passageway is effectively closed. The blades preferably open in a first direction once a predetermined pressure has been reached in the air chamber. Preferably, the blades return to the closed position when the wave reaches its peak. As the wave starts to fall and with the blades in the closed position, a vacuum is preferably created in the air chamber. Preferably, the blades open in a second direction once a predetermined pressure has been reached in the air chamber. The blades preferably open in the second direction once a predetermined negative pressure has been reached in the air chamber as the wave falls.

Preferably, the tip of each blade is curved. The tip of each blade is preferably convex. Preferably, the curvature of the tip of each blade is such that when the plurality of blades are mounted to the hub in a circular array the periphery of the array is generally in the form of a circle.

Preferably, the turbine rotor assembly is used in a single stage turbine. The turbine is preferably a unidirectional reaction turbine. However, the turbine rotor assembly could readily be adapted for use in multi-stage turbines having two or more rotors.

The turbine rotor assembly is advantageously suited for use in extracting energy from an oscillating working fluid. More particularly, the turbine rotor assembly is suitable for use in an oscillating water column (OWC) energy extraction system having an OWC duct. The rotor assembly is preferably mounted in the OWC duct of the energy extraction system such that an air chamber is defined within the duct between the surface of the water in the duct and the hub and blades.

The rotor assembly is preferably adapted for rotation in a single direction, independent of the direction of fluid flow. Preferably, the rotor is arranged to be substantially normal to the direction of fluid flow with the axis of rotation substantially parallel to the fluid direction.

The plurality of blades of the rotor assembly is preferably configured such that the rotor rotates in a predetermined direction. Preferably, the rotor assembly is arranged substantially normal to the flow direction of the working fluid such that it rotates about the longitudinal axis of the housing. In other preferred forms, the rotor assembly is arranged to rotate in a direction substantially parallel to the fluid flow direction.

Preferably, the turbine rotor assembly is rotatably arranged within a flow passage of a housing. The housing is preferably configured to direct the flowing working fluid towards the blades of the rotor assembly. In some embodiments, the housing is configured to have tapered or curved surfaces associated with the flow passage for directing the working fluid towards the blades.

The housing is preferably longitudinal and extends along a longitudinal axis. In some preferred embodiments, the housing has a generally cylindrical body. Preferably, the turbine rotor assembly is arranged substantially coaxially with the longitudinal axis of the housing.

In certain embodiments, the housing is arranged such that its longitudinal axis is arranged substantially parallel to the direction of flow of the oscillating working fluid. In other embodiments, the housing is arranged such that its longitudinal axis is arranged substantially normal to the direction of flow of the oscillating working fluid.

For example, in certain embodiments, the housing could be arranged such that the longitudinal axis is substantially vertical. In other preferred forms, the housing could be arranged such that the longitudinal axis is substantially horizontal. It will be appreciated by those skilled in the art that the housing is not limited to those orientations described above, but could be arranged in any other suitable orientation, relative to the direction of flow of the working fluid, to suit a particular application.

In certain embodiments, guide means is provided upstream of the rotor for directing the working fluid towards the blades of the rotor. Preferably, the guide means includes first and second guides arranged on opposite sides of the rotor to direct the working fluid onto the blades at a desired angle. In some embodiments, the guide means includes one or more guide vanes arranged upstream of the rotor for directing the working fluid towards the blades of the rotor. The guide vanes are preferably arranged in a polar or circular array in proximity to the blades. The guide vanes may be associated with a stator or otherwise arranged within the housing. In certain embodiments, the guide means includes a nose cone extending from the hub.

It will of course be appreciated that the guide vanes are not limited to a particular form and therefore could be any suitable shape, including curved and planar shapes, for deviating the working fluid towards the rotor blades.

The oscillating working fluid is preferably an oscillating airflow. In certain preferred embodiments of the invention, the turbine rotor is configured for rotation by an airflow generated from an oscillating water column of an ocean wave energy extraction system, the oscillating water column (and thus the airflow) oscillating in response to the rise or fall of passing ocean waves.

It will, however, be appreciated by those skilled in the art that the oscillating working fluid is not limited to an oscillating airflow, and in particular, is not limited to an oscillating airflow produced from an oscillating water column. In certain embodiments, the turbine rotor assembly can be adapted for use with a unidirectional working fluid. In embodiments adapted for unidirectional working fluids, the blades can be arranged in an overlapping formation wherein the leading and trailing edges of sequential blades overlap each other.

In preferred embodiments, the rotor has a drive shaft coupled at its proximal end to the hub such that rotation of the hub causes a corresponding rotation of the drive shaft such that its distal end can be used to engage and drive an electric generator.

The hub preferably has a mass which is sufficient for it to act as a flywheel to provide a substantially constant angular velocity, in use.

According to a second aspect of the invention, there is provided a turbine for extracting energy from an oscillating working fluid, the turbine including:
a housing; and
a turbine rotor assembly according to the first aspect of the invention, the turbine rotor assembly being rotatably mounted in the housing for unidirectional rotation in response to the oscillating working fluid flowing through the housing.

According to a third aspect of the invention, there is provided an ocean wave energy extraction system including:
a duct for receiving an oscillating water column, the oscillating water column generating an oscillating airflow;
a housing connected to the duct to define a flow passage for the oscillating airflow;
a turbine rotor assembly according to the first aspect of the invention, the turbine rotor assembly being in fluid communication with the oscillating airflow such that the rotor is driven by the oscillating airflow; and
an electric generator configured for rotation by the turbine rotor assembly to generate electrical energy.

BRIEF DESCRIPTION OF THE DRAWINGS

Preferred embodiments of the invention will now be described, by way of example only, with reference to the accompanying drawings in which.

PREFERRED EMBODIMENTS OF THE INVENTION

Figure 12:
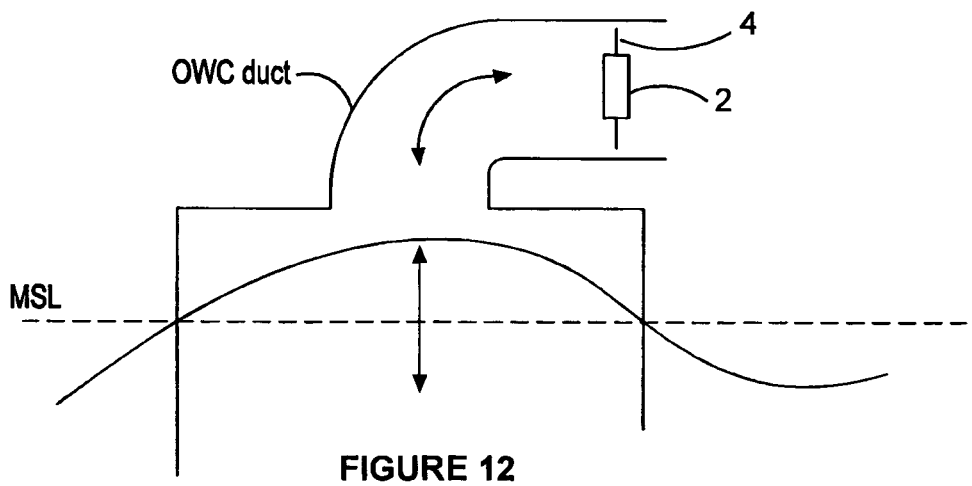
FIG. 12 shows a schematic diagram of an OWC energy extraction system in which the turbine rotor assembly is arranged.

Referring to the drawings, the invention provides a turbine rotor assembly 1 for extracting energy from an oscillating working fluid in the form of an oscillating airflow. The turbine rotor assembly 1 has been developed specifically for use in an ocean wave energy extraction system (FIG. 12) of the type having an oscillating water column.

In such systems, the oscillating water column (OWC) is configured to produce the oscillating airflow in response to the rise and fall of passing ocean waves. As the OWC rises in response to a passing wave crest the OWC rises to produce an exhaust airflow. As the wave continues and the following wave trough passes, the OWC falls to produce an intake airflow.

Figure 1:
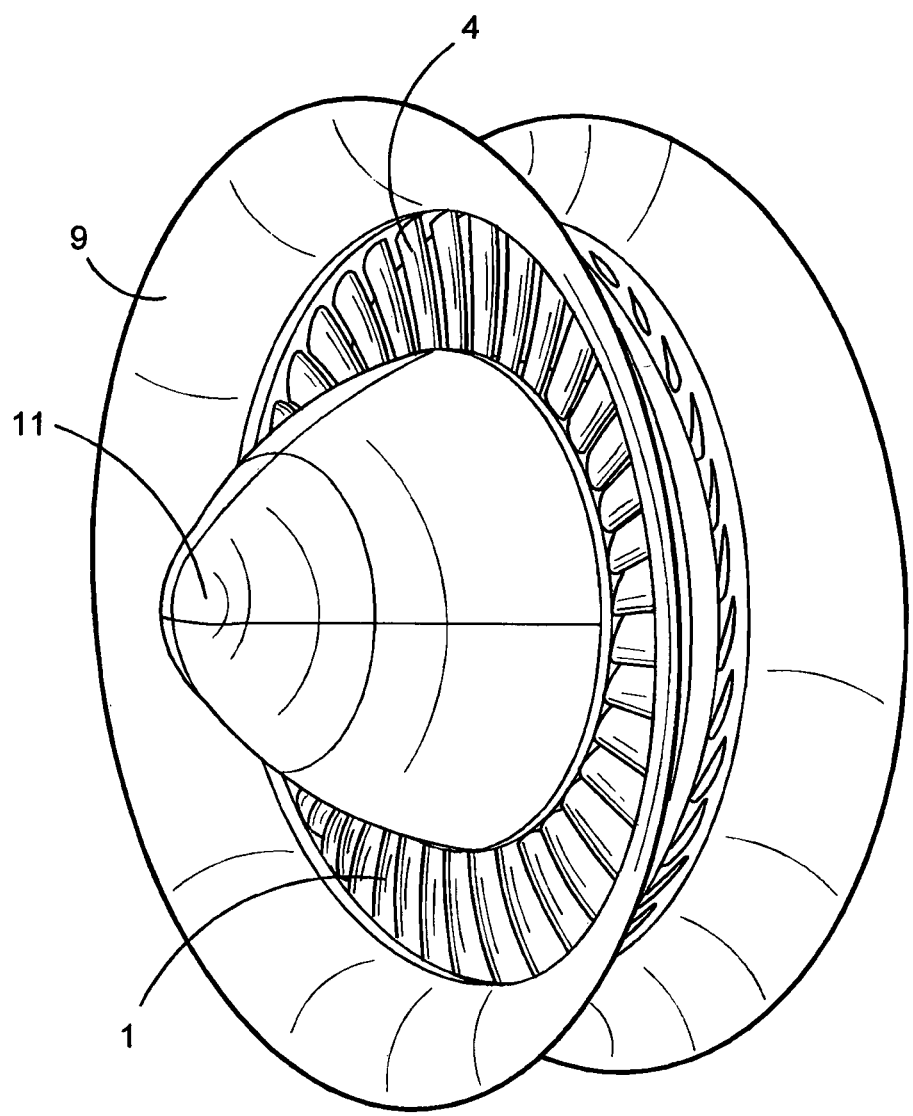
FIG. 1 is a perspective view of a turbine rotor assembly according to the invention.
Figure 2:
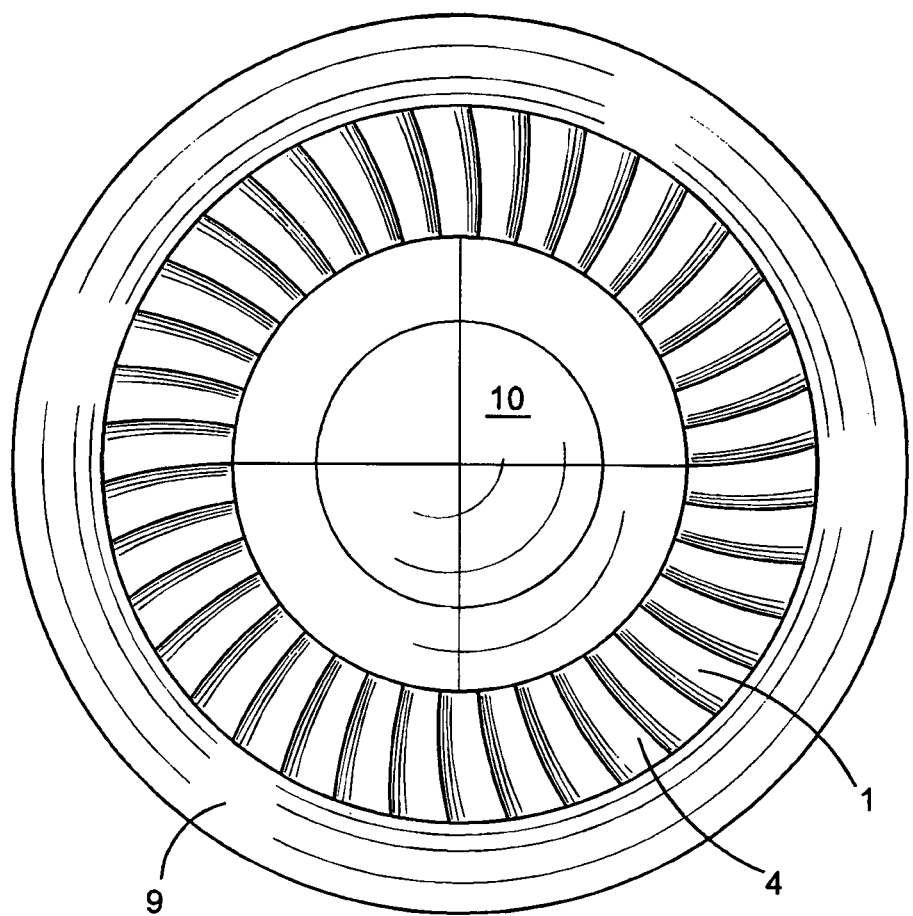
FIG. 2 is a front view of the turbine rotor assembly of FIG. 1.
Figure 3:
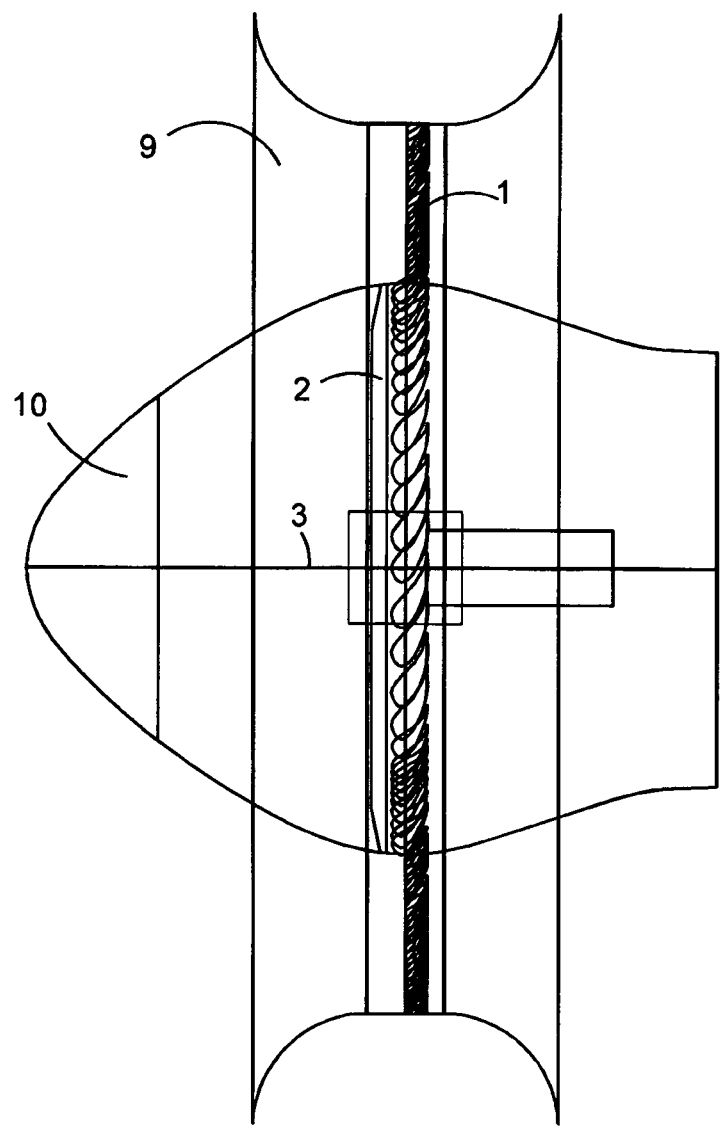
FIG. 3 is a side view of the turbine rotor assembly.
Figure 4:
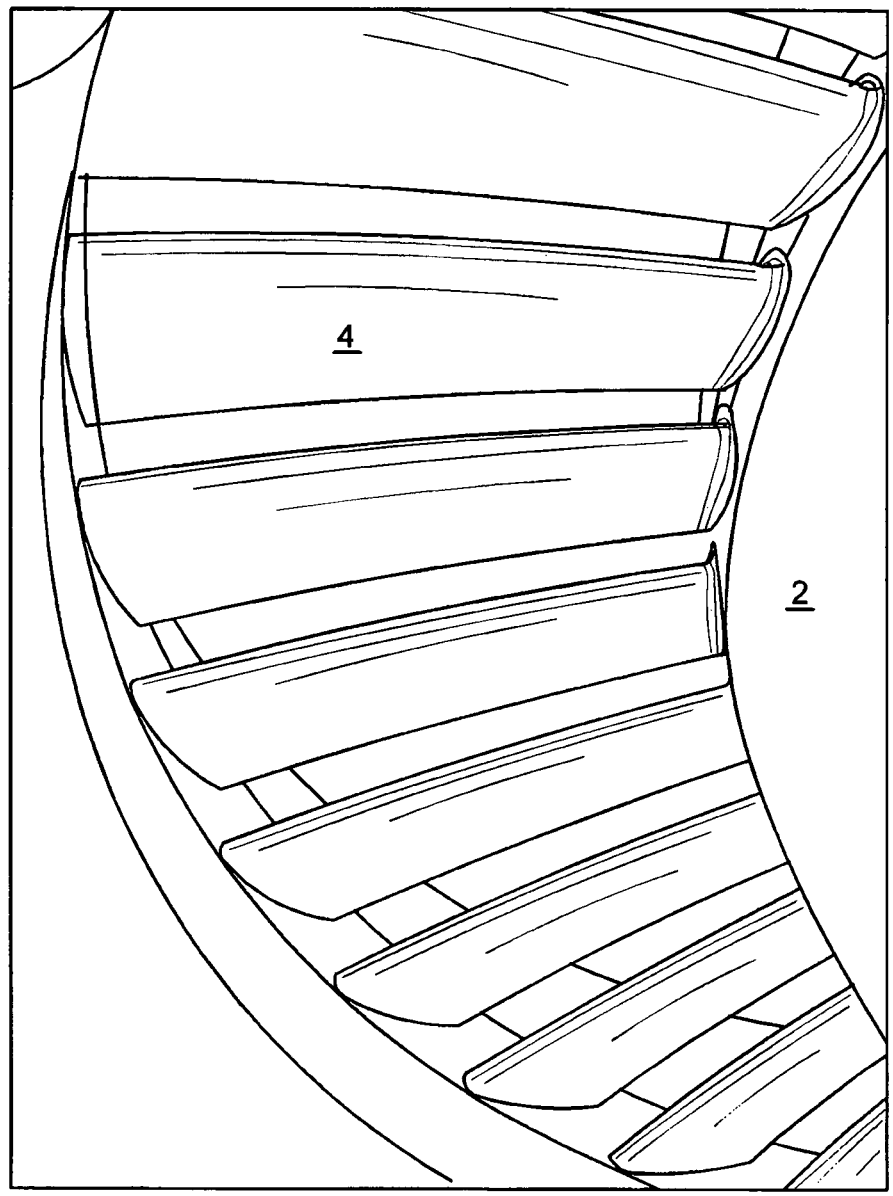
FIG. 4 is an enlarged view of the blades of the turbine rotor assembly.

With reference to FIG. 1, the turbine rotor assembly 1 includes a hub 2 which is rotatable about its central axis 3. A plurality of blades 4 are mounted to the hub 2 about the central axis. As most clearly shown in FIG. 2, the blades are arranged in a non-overlapping, sequential formation so as to form a circular array about the central axis 3 of the hub 2.

To mount the blades 4 on the hub 2, the hub has a series of first mounting elements in the form of radial bores 5 circumferentially arranged about the periphery of the hub 2. Each blade 4 has a second mounting element in the form of a spindle 6 which is received in an associated bore 5 of the hub 2.

Each spindle 6 includes a bearing element 7 which enables the associated blade 4 to be rotatable relative to the hub 2, about an axis of rotation defined by the spindle 6. Each blade 4 is configured to be able to rotate about its spindle 6 through a predetermined angle. In the illustrated embodiment, each blade 4 can rotate through an angle, for example, approximately ±24°. In FIGS. 1 to 4, the blades 4 have rotated to a position suitable for an exhaust airflow (flowing left-to-right in FIG. 3).

Each blade 4 moves in response to a force applied to the blade by the prevailing airflow fluid, the force arising from a pressure difference across the blades. The ability of the blades to change their pitch angle provides the rotor 1 with a self-rectifying characteristic. In particular, the blades 4 can be rotated to suit either an intake or an exhaust airflow and maintain rotation of the hub 2 in a single direction about its central axis.

A control means in the form of a reactive mechanical spring such as a leaf spring 8 is associated with each blade 4 for controlling the changes to the pitch angle. The leaf spring 8 acts to provide a smooth and/or constant change in pitch. In addition, the leaf spring limits the degree to which the pitch of the blade can change.

Figure 5:
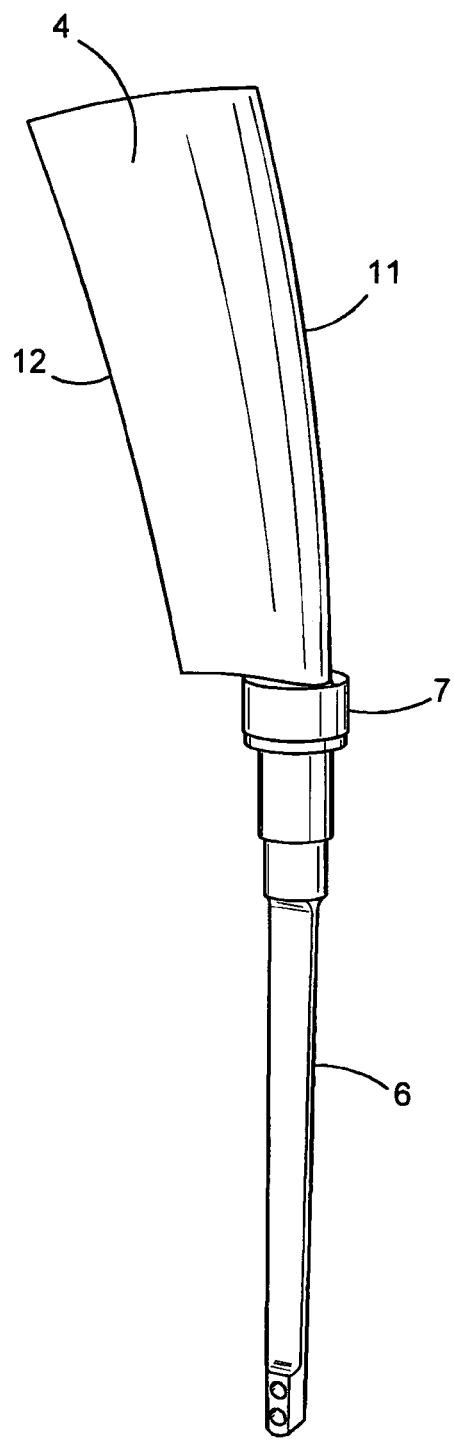
FIG. 5 is a perspective view of a blade and spindle of the turbine rotor assembly.
Figure 6:
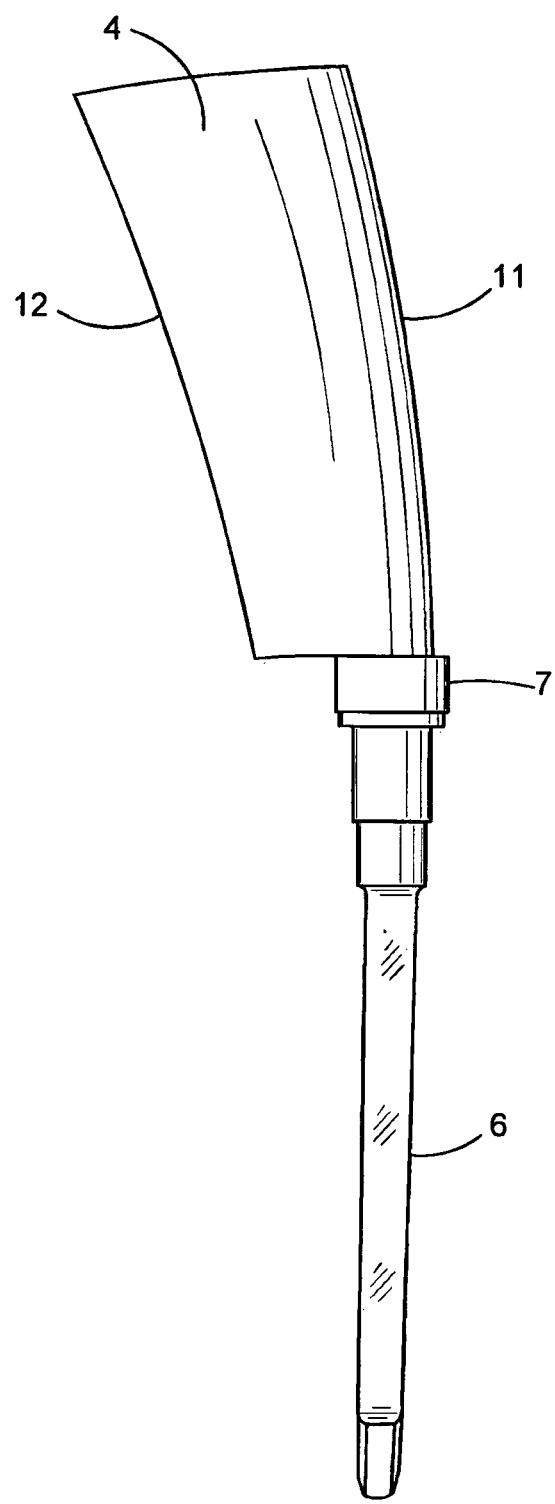
FIG. 6 is a front view of the blade and spindle of FIG. 5.

Referring now to FIGS. 5 and 6, each blade 4 has a leading edge 11 and a trailing edge 12. The leading and trailing edges (11, 12) are advantageously configured to have complementary profiles to each other such that the blades 4 can be mounted to the hub 2 in close fitting edge-to-edge proximity to each other.

It will be appreciated by those skilled in the art that the close fitting edge-to-edge proximity between sequential blades, which can be achieved with the complementary profiled leading and trailing edges, advantageously results in an increased frontal surface area of each blade, and consequentially reduces the gap between blades (when viewing the rotor from the front or back—i.e. along the line of the central axis). Moreover, when the blades are in a neutral position (pitch angle=0°), the complementary profiles provide for a substantially constant gap width along the length of the adjacent edges (11, 12).

In the neutral position, the gap between the blades is merely a clearly gap and minimised to the available manufacturing tolerances. As such, the total gap area is negligible and is sufficient to effectively close the passageway and almost totally obstruct the flow of air through the blades. In other words, the solidity ratio (i.e. the ratio of the total combined blade area to the swept area of the blades) of the rotor assembly is almost 1.0. Accordingly, when the blades are in the neutral position closing the passageway, the pressure in the air chamber increases due to the decrease in volume as the wave rises. Similarly, as the wave falls from its peak, the closed blades inhibit the intake of air into the air chamber and thus allow the pressure in the chamber to drop.

The ability to hold the blades closed until a predetermined pressure is reached advantageously increases the magnification of the wave height in the OWC duct to thereby improve the efficiency of the turbine. It has been numerically modelled that an improvement in the total energy extraction can be achieved by holding the blades closed.

In addition, when the blades open, the increased surface area enables the airflow to pass across more blade surface which in turn provides additional lift and thrust forces for rotating the hub and thus improves the efficiency of the rotor 1, as described in further detail below. This improved efficiency arises from an improved pressure profile across each blade as shown in FIG. 9.

The substantially constant width of the gap defines a nozzle which, at least in preferred forms, operates to increase the velocity of the prevailing airflow, further increasing the lift and thrust forces applied to the blades.

Figure 7:
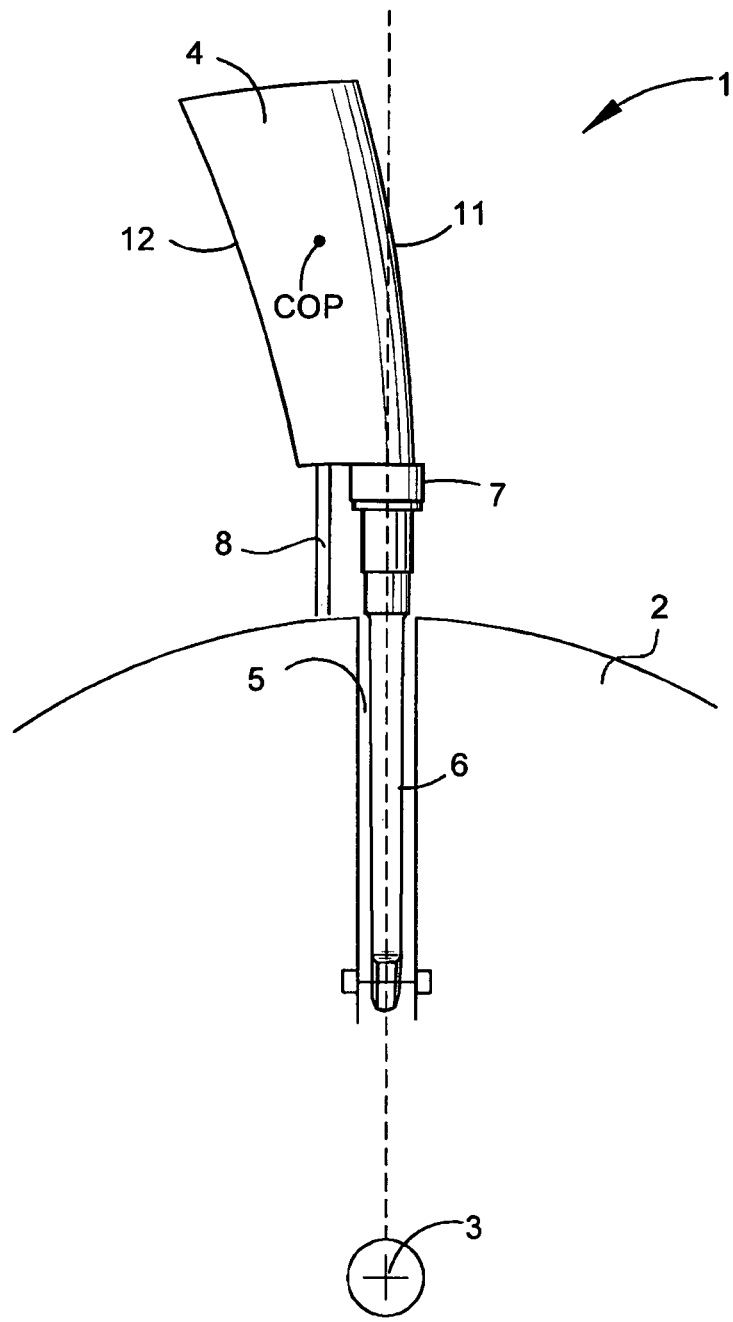
FIG. 7 is a schematic illustration of a blade mounted to the hub.

As most clearly shown in FIG. 7, the mounting means and shape of the blade is such that the centre-of-pressure (COP) is operatively behind the axis of rotation of the spindle of each blade. That is, the leading and trailing edges curve away from the spindle to place the centre-of-pressure behind the axis of rotation to enable the blade to rotate about the axis of rotation.

Figure 8:
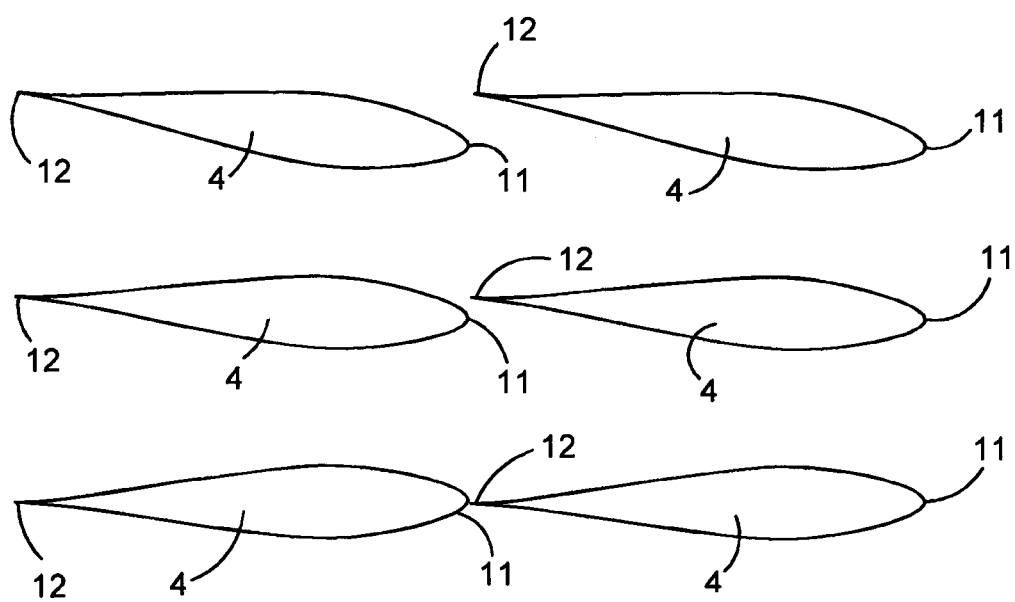
FIG. 8 shows a pair of adjacent blades at three different pitch angle.
Figure 9:
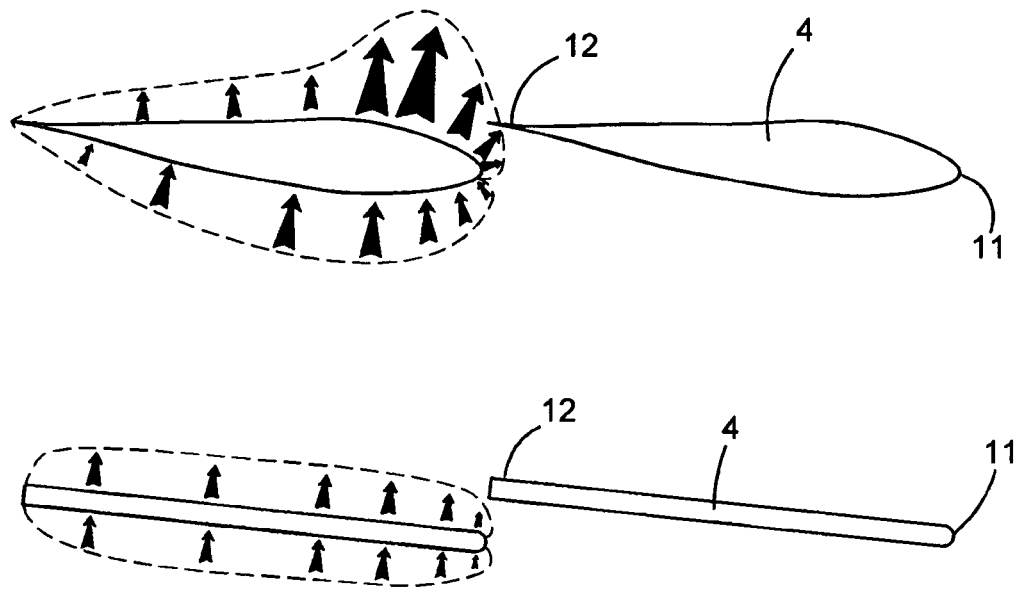
FIG. 9 shows the pressure profile across an aerofoil shaped blade and a planar blade.
Figure 10:
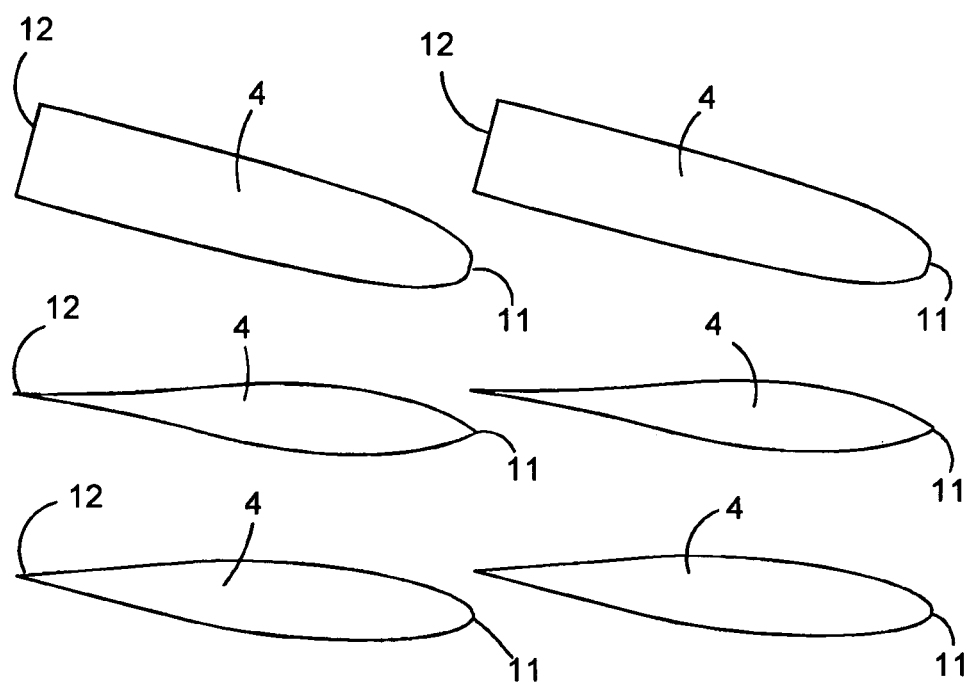
FIG. 10 shows three pairs of blades, each pair having a different cross-sectional profile for various embodiments.

A variety of cross-sectional profiles of the blades are shown in FIGS. 8, 9 and 10. With reference to these figures, it can be seen that each blade preferably has a symmetrical cross-sectional profile.

The turbine rotor assembly 1 is rotatably arranged within a flow passage of a cylindrical housing 9. As most clearly shown in FIGS. 1 and 3, the housing 9 is preferably configured to have curved inlet opening for directing the airflow towards the blades of the rotor. To further facilitate directing of the airflow towards the blades, a nose cone 10 extending from the hub 2 is provided.

In use, the hub 2 of the rotor 1 is preferably coupled to a drive shaft which is engaged to an electric generator (not shown). Rotation of the hub 2 causes a corresponding rotation of the drive shaft to drive the electric generator.

The arrangement of the blades on the rotor assembly is such that in the neutral or non-actuated position, the fluid flow passage through the housing is almost entirely blocked by the blades (albeit for the small clearance gaps between sequential blades and between the tips of the blades and the housing). Such a blockage creates a full differential pressure across the blades between the upstream and the downstream flow directions. Computational fluid dynamic (CFD) analysis has shown that a very thin section blade yields excellent results and an aerofoil section shape is not critical.

This blockage of fluid flow establishes a pressure difference across the blades on the upstream and downstream sides of the blades. The pressure difference creates a force normal to the surface of the blades with a resultant force comprising a component in the axial rotation direction of the rotor and a component in the direction of rotation of the rotor, this component being the torque that produces the power from the turbine. It will be appreciated that the terms "upstream" and "downstream" are used in a relative sense, dependent upon the direction of flow of the oscillating airflow.

In a power producing mode, the working fluid is allowed to pass between the nozzles created between the leading and trailing edges of the sequentially arranged blades. The nozzles are created by a geometric rotation of the blades about an axis of rotation orthogonal, but not necessarily perpendicular to, the axis of rotation of the central axis of the hub. The nozzles allow the working fluid to flow through the array of blades in a preferred manner and rate such that the pressure differential across the upstream and downstream sides of the blade array is not substantially reduced compared to the pressure created when the blades are in their neutral position. That is, the pressure difference across the blades from the upstream to the downstream sides of the blades is advantageously substantially maintained when the nozzles are created by actuation of the blades from their neutral position.

The consequence of substantially maintaining the pressure differential as the blades are rotated about their respective axes is a resultant rotation of the force vector acting across each blade such that the force vector now contains an axial thrust component in the direction parallel to the central axis of rotation of the blade array and a thrust component orthogonal to the central axis. This orthogonal thrust component creates a torque moment on the hub which in turn produces useful rotational power in the direction of rotation about the central axis of the rotor assembly.

The preferred method of forming each nozzle is by rotation of the entire blade about an axis orthogonal to the central axis of the hub. However, in other embodiments, the nozzles may be formed via the structural deformation of the blade. Such shape deformation may be via the applied fluid pressure on the blade surface contributing to the deformation or via other electromechanical induced control methods.

The configuration and profile of the nozzles can produce a secondary benefit to the induced power producing thrust of the blades. In particular, the leading and trailing edges are preferably shaped to define a nozzle profile with a smooth area reducing section to cause the flowing fluid to accelerate through the nozzle, thereby exchanging pressure energy for kinetic energy. The consequence of which is a further reduction in pressure over the leading edge and forward section of the blades on the downstream side. This pressure reduction results in a normal force with a component in the axial and the rotational directions. The rotational direction force is converted to torque about the central axis, whereby this extra contribution may further enhance the magnitude of the rotational force vector.

Figure 11:
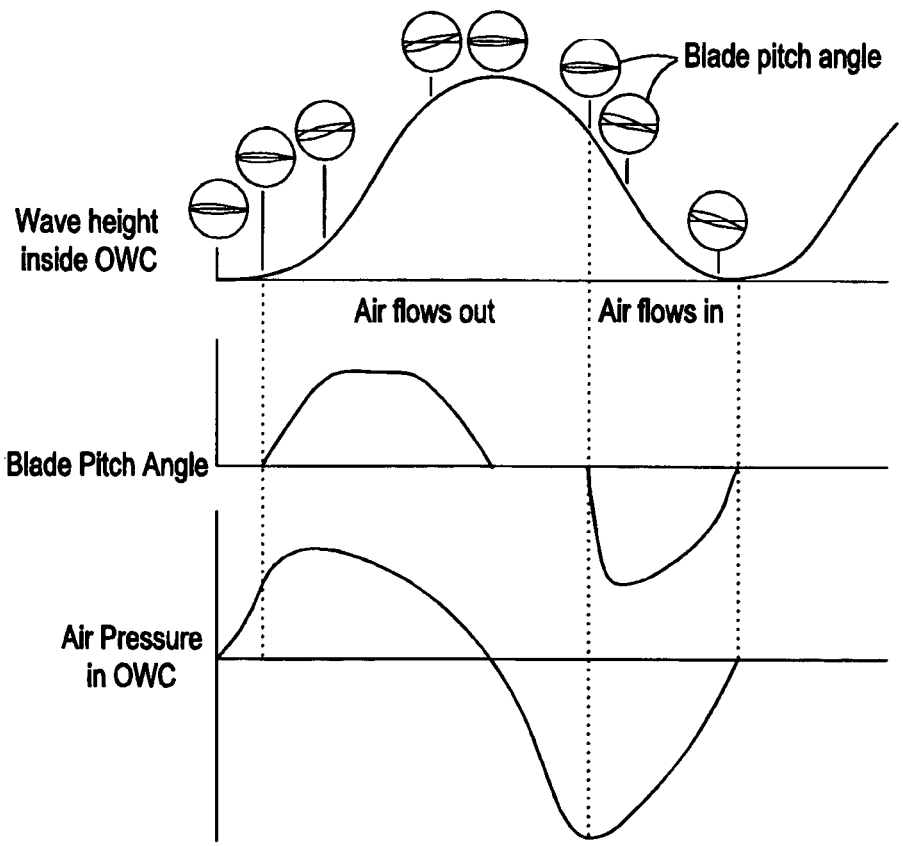
FIG. 11 shows a graph of the blade pitch angle against the height of the oscillating water column inside an OWC duct and against the pressure with the air chamber between the water level and the rotor (hub and blade assembly)

The blade pitch angle and the corresponding pressure in the air chamber can be seen for a complete wave cycle in FIG. 11. It can be clearly seen from FIG. 11 that the blades are held closed when the blade is rising from its trough until a predetermined pressure is reached in the chamber. The blades are also held closed from the time the peak of the wave is reached until it falls and creates a second (negative) predetermined pressure in the chamber.

To hold the blades closed until a certain pressure in the chamber is achieved a mechanical spring system containing a spring pretension force is used. In other forms, a hydraulic piston with a preload fluid pressure that is defined by the pressure in an accumulator or mechanic spring piston accumulator can be used. A magnetic actuator system with a preset holding force could also be used.

The closing of the blades includes a time dependent damping system such that the closing rate of the blades is reduced and blade closing rate becomes independent of the pressure in the OWC (i.e. the damping system acts against the spring pretension force). This system allows all of the air in the OWC chamber to escape at the end of the wave stroke. This allows for a greater internal wave height amplitude at the beginning of the next stroke as well as allowing more air to be entrained in the chamber before the up stroke and less air to be entrained in the chamber before the commencement of the down stroke.

The preset opening pressure is adjusted such that the preset opening pressure is a function of the rotational speed (rpm) of the turbine. This enhancement allows the turbine to operate in its optimal efficiency range as well as allowing the turbines rpm to more closely match the available wave energy states, specifically the height of the incoming waves.

Advantageously, the inhale and exhale cycles of the turbine blade pitch control can be independent from each other, as per the mechanisms described above.

Again, the ability to control the blades such that they are held closed until a predetermined pressure is reached in the air chamber (for both airflow directions) advantageously magnifies the amplification of the OWC and thereby increases the amount of pneumatic power extracted and improves the efficiency of the turbine.

Accordingly, the present invention, at least in its preferred embodiments, provides a turbine rotor assembly of increased efficiency. The turbine rotor assembly advantageously enables increased amounts of energy to be extracted from an oscillating or bidirectional working fluid. In particular, the turbine rotor assembly has blades which advantageously provide an increase frontal area of the turbine blades which constricts the fluid flow passage to create a greater pressure differential across the blades, resulting in increases in the lift and thrust forces being applied to the blades. The close fitting edge-to-edge proximity of the blades also advantageously provides for nozzles which can increase the velocity of the airflow, again increasing the pressure difference across the blade with a resultant increase in thrust.

The turbine rotor assembly is particularly suited for use in an ocean wave energy extraction system, wherein the working fluid is an oscillating airflow generated by an oscillating water column of the ocean wave energy extraction system, the oscillating water column (and thus the airflow) oscillating in response to the rise of fall of passing ocean waves.

In these and other respects, the invention in its preferred embodiments, represents a practical and commercially significant improvement over the prior art.

Although the invention has been described with reference to specific examples, it will be appreciated by those skilled in the art that the invention may be embodied in many other forms.

The invention claimed is:

1. A turbine rotor assembly for extracting energy from an oscillating working fluid, the turbine rotor assembly including:
   a hub rotatable about a central axis;
   a plurality of blades mountable to the hub about the central axis, each blade having a leading edge and a trailing edge, wherein the leading edge and trailing edge are configured to be complementary in profile to each other such that the blades can be mounted in close fitting edge-to-edge proximity to each other.

2. A turbine rotor assembly according to claim 1, wherein the plurality of blades are arranged sequentially to form a circular array about the central axis.

3. A turbine rotor assembly according to claim 1, wherein the blades are arranged in a non-overlapping sequential formation.

4. A turbine rotor assembly according to claim 1, wherein each blade is mounted to the hub via a mounting means.

5. A turbine rotor assembly according to claim 1, wherein the mounting means includes a plurality of receiving formations in the hub and a shaft extending from a root of each blade, the shafts being receivable in the receiving formations.

6. A turbine rotor assembly according to claim 1, wherein the blade is movable relative to the hub such that the blade can change its pitch relative to the direction of flow of the working fluid.

7. A turbine rotor assembly according to claim 6, wherein each blade moves in response to a force applied to the blade by the working fluid.

8. A turbine rotor assembly according to claim 6, wherein the mounting means is configured such that all blades change their pitch at the same time and by the same degree.

9. A turbine rotor assembly according to claim 6, wherein each blade rotates about its associated shaft to change its pitch angle relative to the direction of flow of the working fluid so that the hub and blades rotate in one direction only about the central axis, regardless of the direction of fluid flow.

10. A turbine rotor assembly according to claim 6, wherein each blade is configured to be able to rotate about the spindle through a predetermined angle.

11. A turbine rotor assembly according to claim 6, wherein the rotatable blades can be retained in a neutral position or closed position so that each blade is aligned around the circumference of the hub to substantially close the fluid passageway through the blades.

12. A turbine rotor assembly according to claim 6, wherein the rotation of the blades is controlled by an actuator.

13. A turbine rotor assembly according to claim 12, wherein the actuator is responsive to changes in the properties of the prevailing working fluid within the flow passage.

14. A turbine rotor assembly according to claim 12 wherein, the actuator is mechanically, electromechanically, hydraulically or pneumatically operated.

15. A turbine rotor assembly according to claim 12, wherein the actuator is configured to open the blades in a first direction based on a first set of criteria and in a second direction based on a second set of criteria.

16. A turbine rotor assembly according to claim 15, wherein the first set of criteria is determined from properties associated with a rising wave and the second set of criteria is determined from properties associated with a falling wave.

17. A turbine rotor assembly according to claim 12, wherein a control means is in communication with the actuator for controlling movement of the blades.

18. A turbine rotor assembly according to claim 17, wherein the control means includes a damper for providing a smooth and/or constant change in pitch.

19. A turbine rotor assembly according to claim 18, wherein the damper is adapted to control the speed at which the blade rotates.

20. A turbine rotor assembly according to claim 6, wherein the leading edge and trailing edge of each blade is curved or arcuate in shape.

21. A turbine rotor assembly according to claim 20, wherein each leading edge is convex in curvature.

22. A turbine rotor assembly according to claim 20, wherein each trailing edge is concave in curvature.

23. A turbine rotor assembly according to claim 6, wherein the leading and trailing edges of each blade are substantially straight.

24. A turbine rotor assembly according to claim 6, wherein the mounting means and shape of the blade is such that the centre-of-pressure of the blade is operatively behind the axis of rotation of the shaft of each blade.

25. A turbine rotor assembly according to claim 6, wherein each blade has a generally symmetrical cross-sectional profile.

26. A turbine rotor assembly according to claim 6, wherein the cross-sectional profile of each blade is an aerofoil profile.

27. A turbine rotor assembly according to claim 26, wherein the aerofoil profile has an enlarged rounded leading edge and tapers inwardly towards a narrower trailing edge.

28. A turbine rotor assembly according to claim 6, wherein the blades can be interchangeable with blades of a different profile so as to achieve a different operating characteristic of the turbine.

29. A turbine rotor assembly according to claim 6, wherein the trailing edge of a first blade and the leading edge of a second blade immediately following the first blade together define a nozzle.

30. A turbine rotor assembly according to claim 29, including a pressure sensor for sensing the pressure in an air chamber of an oscillating water column duct in which the hub and blades are arranged, the pressure sensor being operatively associated with the actuator and/or control means such that when a predetermined pressure is sensed the blades rotate to open the nozzles.

31. A turbine rotor assembly according to claim 1, wherein the turbine rotor assembly is rotatably arranged within a flow passage of a housing.

32. A turbine rotor assembly according to claim 31, wherein the housing is configured to direct the flowing working fluid towards the blades of the hub and blade assembly.

33. A turbine rotor assembly according to claim 31, wherein the housing has tapered or curved surfaces associated with the flow passage for directing the working fluid towards the blades.

34. A turbine rotor assembly according to claim 31, wherein a guide means is provided for directing the working fluid towards the blades.

35. A turbine rotor assembly according to claim 1, wherein a drive shaft is coupled to the hub at its proximal end and to an electric generator at its distal end.

36. A turbine rotor assembly according to claim 1, wherein the hub has a mass which is sufficient for it to act as a flywheel to provide a substantially constant angular velocity of the hub.

37. A turbine for extracting energy from an oscillating working fluid, the turbine including:
  a housing; and
  a turbine rotor assembly according to claim 1, the turbine rotor assembly being rotatably mounted in the housing for unidirectional rotation in response to the oscillating working fluid flowing through the housing.

38. An ocean wave energy extraction system including:
  a duct for receiving an oscillating water column, the oscillating water column generating an oscillating airflow;
  a housing connected to the duct to define a flow passage for the oscillating airflow;
  a turbine rotor assembly according to claim 1, the turbine rotor assembly being in fluid communication with the oscillating airflow such that the rotor is driven by the oscillating airflow; and
  an electric generator configured for rotation by the turbine rotor assembly to generate electrical energy.

* * * * *